(12) United States Patent
Adamczyk et al.

(10) Patent No.: US 7,184,535 B1
(45) Date of Patent: Feb. 27, 2007

(54) METHODS AND SYSTEMS FOR RELEASING A VOICE MAIL SYSTEM FROM A COMMUNICATION AND FURTHER PROCESSING THE COMMUNICATION

(75) Inventors: Maria Adamczyk, Alpharetta, GA (US); Navneet Patel, Marietta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/513,679

(22) Filed: Feb. 25, 2000

Related U.S. Application Data (60) Provisional application No. 60/121,884, filed on Feb. 26, 1999.

(51) Int. Cl.
*H04M 3/42* (2006.01)
(52) U.S. Cl. .............................. 379/212.01; 379/221.01
(58) Field of Classification Search ................ 379/221, 379/265.09, 88.13, 88.17, 210, 211, 212, 379/212.01, 201.01, 221.01
See application file for complete search history.

(56) References Cited

U.S. PATENT DOCUMENTS

| | | | |
|---|---|---|---|
| 4,930,152 A | 5/1990 | Miller | |
| 4,933,967 A | 6/1990 | Lo et al. | |
| 5,058,152 A | 10/1991 | Solomon et al. | |
| 5,353,331 A | 10/1994 | Emery et al. | |
| 5,361,295 A | 11/1994 | Solomon et al. | |
| 5,425,091 A | 6/1995 | Josephs | |
| 5,493,607 A | 2/1996 | Arumainayagam et al. | |
| 5,521,969 A | 5/1996 | Paulus et al. | |
| 5,572,583 A | 11/1996 | Wheeler, Jr. | |
| 5,583,920 A * | 12/1996 | Wheeler, Jr. ............. | 379/88.01 |
| 5,680,442 A | 10/1997 | Bartholomew et al. | |

(Continued)

FOREIGN PATENT DOCUMENTS

EP     0 255 325     2/1988

(Continued)

OTHER PUBLICATIONS

"Die T-Net-Box- der Anrufbeantworter im Netz", XP-000861610, 1998.

(Continued)

*Primary Examiner*—Fan Tsang
*Assistant Examiner*—Olisa Anwah
(74) *Attorney, Agent, or Firm*—Thomas, Kayden, Horstemeyer & Risley LLP (57) ABSTRACT

Methods and systems relating to a communication in an Advanced Intelligent Network from a caller to a subscriber's directory number where the communication has been terminated to a voice mail system (VMS) instead having been terminated to the subscriber's directory number. The methods and systems transfer the communication from the VMS so the VMS is no longer involved in the communication. A message indicating a release of the communication by the VMS is generated. The message also indicates an action to be taken regarding the communication such as a transfer to a different number. The action and related information may be provided in a remote operations parameter of a GR-1129 message. In response, directions are provided to carry-out the action. As a result, the communication is released from the VMS, and is acted upon without further involvement of the VMS.

9 Claims, 5 Drawing Sheets

U.S. PATENT DOCUMENTS

| | | | |
|---|---|---|---|
| 5,684,862 A | 11/1997 | Finnigan | |
| 5,692,033 A | 11/1997 | Farris | |
| 5,712,903 A | 1/1998 | Bartholomew et al. | |
| 5,717,742 A | 2/1998 | Hyde-Thomson | |
| 5,740,230 A | 4/1998 | Vaudreuil | |
| 5,740,231 A | 4/1998 | Cohn et al. | |
| 5,742,763 A | 4/1998 | Jones | |
| 5,742,769 A | 4/1998 | Lee et al. | |
| 5,742,905 A | 4/1998 | Pepe et al. | |
| 5,764,747 A | 6/1998 | Yue et al. | |
| 5,768,348 A | 6/1998 | Solomon et al. | |
| 5,790,637 A | 8/1998 | Johnson et al. | |
| 5,812,639 A | 9/1998 | Bartholomew et al. | |
| 5,812,670 A | 9/1998 | Micali | |
| 5,832,072 A | 11/1998 | Rozenblit | |
| 5,832,221 A | 11/1998 | Jones | |
| 5,838,768 A | 11/1998 | Sumar et al. | |
| 5,848,132 A | 12/1998 | Morley et al. | |
| 5,905,774 A | 5/1999 | Tatchell et al. | |
| 5,930,479 A | 7/1999 | Hall | |
| 5,940,478 A | 8/1999 | Vaudreuil et al. | |
| 6,005,845 A | 12/1999 | Svennesson et al. | |
| 6,064,723 A | 5/2000 | Cohn et al. | |
| 6,148,069 A * | 11/2000 | Ekstrom et al. | 379/221.08 |
| 6,169,795 B1 | 1/2001 | Dunn et al. | |
| 6,209,100 B1 | 3/2001 | Robertson et al. | |
| 6,226,359 B1 | 5/2001 | Montgomery et al. | |
| 6,233,318 B1 | 5/2001 | Picard et al. | |
| 6,243,374 B1 | 6/2001 | White et al. | |
| 6,301,349 B1 * | 10/2001 | Malik | 379/211.02 |
| 6,317,484 B1 | 11/2001 | McAllister | |
| 6,330,079 B1 | 12/2001 | Dugan et al. | |
| 6,339,640 B1 | 1/2002 | Chen et al. | |

FOREIGN PATENT DOCUMENTS

| | | | |
|---|---|---|---|
| EP | 0255325 | * | 2/1988 |
| EP | 0 412 799 | | 2/1991 |
| EP | 0 507 125 | | 10/1992 |
| EP | 0 543 235 | | 5/1993 |
| EP | 0 543 235 | A2 | 5/1993 |
| EP | 0 624 967 | | 11/1994 |
| EP | 0 662 762 | | 7/1995 |
| EP | 0782304 | A2 | 7/1997 |
| EP | 0782315 | A2 | 7/1997 |
| EP | 0782316 | A2 | 7/1997 |
| EP | 0813162 | A2 | 12/1997 |
| EP | 0825752 | A2 | 2/1998 |
| EP | 0841796 | A2 | 5/1998 |
| EP | 0843453 | A2 | 5/1998 |
| EP | 0886228 | A2 | 12/1998 |
| EP | 0841796 | A3 | 8/1999 |
| WO | 97/08901 | | 3/1997 |

OTHER PUBLICATIONS

"Voice Services on the Intelligent Network: Intelligent Peripherals and Service Nodes" F. Bosco , XP-000607359, Aug. 1992.

"The Belcore and ITU-T Call Model Operations", XP-002141946, 1998.

"Transactions in Intelligent Networks", XP-002141947, 1998.

"General Recommendations on Telephone Switching and Signalling—Introduction to Intelligent Network Capability Set 1", International Telecommunication Union, XP 002141945, Mar. 1993.

Bosco, F., Voice Services on the Intelligent Network: Intelligent Peripherals and Service Nodes, CSELT Technical Reports, vol. XX, No. 4—Aug. 1992, Torino, Italy.

Search Report PCT/US/05002.

"An Enhanced Message Networking Topology: Multimedia Messaging with Intuity™ Interchange Server," Bell Labs Technical Journal, Apr.-Jun. 1998, pp. 124-135.

* cited by examiner

METHODS AND SYSTEMS FOR RELEASING A VOICE MAIL SYSTEM FROM A COMMUNICATION AND FURTHER PROCESSING THE COMMUNICATION

RELATED APPLICATION

The present application claims priority to and the benefits of the prior-filed copending and commonly owned provisional application entitled "Method and System for Locating a Messaging Subscriber From Within A Voice Mail Messaging System," filed in the United States Patent and Trademark Office on Feb. 26, 1999, assigned Application No. 60/121,884 and incorporated herein by reference.

FIELD OF THE INVENTION

The present inventions relate to the field of telecommunications, and particularly, relate to the use of voice messaging systems in an Advanced Intelligent Network (AIN).

BACKGROUND

Getting a message to somebody is facilitated when the person for whom the message is intended has a telephone answering machine or subscribes to a voice mail service. For example, assume a soccer team captain has to get word to his or her team members that a scheduled game has been moved to an earlier time. Assume half the team members do not have answering machines nor subscribe to voice mail services (the "have-nots"). To get the message to the have-nots, the team captain must reach each have-not by direct telephone conversation, in person, or by some other means to substantially assure himself or herself that the have-not received the message about the rescheduled time for the game.

For the other half of the team members, who have answering machines or subscribe to a voice mail service (the "havers"), the team captain's messaging task is easier. The team captain may leave a message for each haver on the respective haver's answering machine or voice mail service, and the team captain may be substantially assured the message has been at least delivered for retrieval by the haver.

But there are times when leaving a message for a person on his or her answering machine or voice mail service is insufficient. For example, a caller may have an urgent message for the called party that the caller desires to deliver as soon as possible and directly. In that urgent situation (as well as in others), the routing of the caller's call to the answering machine or to the voice mail service may frustrate the caller. The answering machine or voice mail service may be considered by the caller to be a "dead-end" because there no options available to the caller except to hang up or leave a message. In some systems typically used in businesses or similar institutions, the caller is provided with the option of dialing "0" to reach an operator or dialing another extension to reach the called party's assistant, colleague, or other substitute. But these systems still are a "dead-end" for the caller who would like to speak directly to the called party.

Accordingly, there is a need for a messaging system that provides a caller with at least an option in addition to the three options of leaving a message, hanging up, or reaching a substitute for the called party.

There are technical reasons that there remains a need for a messaging system with more than the three options mentioned above. Answering machines and network voice mail platforms are a sort of "dead-end" in the telecommunications network. A call that is picked up by an answering machine associated with a called party's telephone or a voice mail platform serving the subscriber is in effect terminated to that device as if the called party had picked up the call. The device "answers" the call and typically offers a greeting and takes a message in place of the called party. The typical answering machine or voice mail platform does not have features to implement other more advanced options such as forwarding a call, etc.

Among the reasons that the typical answering machine or voice mail platform does not have the features to implement more advanced options is that such features would add greatly to the complexity and expense of an answering machine or voice mail platform. Essentially, to add these advanced features would be to add substantial telecommunications switch features to the device. Given the complexity, cost, size, and other characteristics of a telecommunications switch, adding substantial switch features to an answering machine or voice mail platform is an impractical solution to the need for a messaging system that provides a caller with more than the options of leaving a message, hanging up, or reaching a substitute for the called party.

Accordingly, there is also a need for a messaging system that provides a caller with at least an option in addition to the three options of leaving a message, hanging up, or reaching an operator or other substitute for the called party, and that provides the option without adding substantial telecommunications switch features to an answering machine or a voice mail platform.

Even if an answering machine or voice mail platform were provided with enough features to provide at least an advanced option to a caller with respect to a call to a called party, there remain issues to be resolved with respect to such a device. These issues include the involvement of the device in the processing of the calls that reach the device and that may be further processed afterwards.

With the additional feature(s), it is likely the device would remain in the call path when implementing an advanced option for a call. For example, assume a caller has reached the device and is presented with the option of being forwarded to another telephone number so as to have another chance to speak directly to the called party. If the device simply forwards the call to the other telephone number, then the device may remain as an element in the call path.

By remaining an element in the call path, the device takes up resources of the telecommunications network. In addition, by remaining an element in the call path, the device may limit, if not eliminate, its own resources to take other calls for the called party. Rather than being able to take another call, the device may be effectively "busy" by having forwarded the call to the other telephone number or implemented another feature. Whether the resources that are taken up are those of the telecommunications network or of the device, the result of the take-up in resources is an increase in cost in at least operation of the advanced device.

Accordingly, there is a further need for a messaging system that provides a caller with at least an option in addition to the three options of leaving a message, hanging up, or reaching an operator or other substitute for the called party, that provides the option without adding substantial telecommunications switch features to an answering machine or a voice mail platform, and that is not included in the call path or other further processing applicable to a call for a called party when an advanced option is applied to the call.

SUMMARY

Generally stated, the present inventions relate to the release of a voice mail system (VMS) from involvement with a communication in an Advanced Intelligent Network (AIN) when the communication has been terminated to the VMS, but the communication is to undergo further processing in the AIN. Advantageously, the release of the VMS from the communication frees up the VMS for other calls, reduces use of the infrastructure of the AIN by obviating the connections of the communication to the VMS, and otherwise improves the efficiency of processing the communication.

More specifically, assume a caller initiates a communication to a subscriber's directory number, but the communication is terminated to a VMS serving the subscriber instead of the communication having been terminated to the terminating equipment associated with the subscriber's directory number. Typically, a VMS requests the caller to leave a voice mail message, which would be stored by the VMS so as to be retrievable by the subscriber. Advantageously, the present inventions allow the caller to leave a voice mail message, but the present inventions also provide the caller or the communication with an alternative.

By this alternative, the VMS may solicit the caller or the communication for an indication of an action to be taken with respect to the communication. In other words, the VMS may provide the caller or the communication with an option for the exercise of an action to be taken relating to the communication. An action may be something other than receipt of a voice mail message from the caller or the communication by the VMS as retrievable by the subscriber. An action generally includes an event allowing for the release of the communication from the VMS. An action may include a transfer of the communication to a different directory number, i.e., a transfer of the call to another number. Thus, the VMS may solicit the caller or the communication by providing the following announcement: "If you would like to try to contact the subscriber at another directory number specified by the subscriber, please press '0'".

If the caller or the communication desires to attempt to contact the subscriber at the different directory number, the caller or communication provides the indication of the action to be taken with respect to the communication. A receiver of the VMS receives this indication.

In response to receipt of the indication of the action by the VMS, a transmitter of the VMS transmits a message indicating the action to be taken with respect to the communication and indicating a release of the communication by the VMS. The message may be a GR-1129 message including a remote operations (RO) parameter. The RO parameter may include information indicating that the action to be taken with respect to the communication is a transfer of the communication (away from the VMS). The RO parameter may include the different directory number to which the communication is to be transferred. This different directory number may have been selected and input by the subscriber when the subscriber set up his or her preferences with respect to the service received from the VMS (or input by the subscriber at any other time in connection with his or her service from the VMS). The RO parameter also may include the subscriber's directory number, which may be used later in the processing of the communication in various ways, such as by inclusion in a request for a billing record relating to the communication.

Advantageously, as a result of the message, the VMS is released from the communication, which is then acted upon based upon the information in the message supplied by the VMS without further involvement of the VMS with the communication.

The message from the VMS may be received by the service switching point (SSP) serving the VMS. The SSP provides this message to a service control point (SCP). In response to the receipt of the message from the SSP, the SCP directs that the action indicated in the message be taken with respect to the communication. For example, when the action indicated in the message is a transfer of the communication, the SCP directs the communication be transferred. The SCP may direct the SSP to route the communication, and the SSP follows the direction.

In the course of routing the communication to the different directory number in the message, the communication typically is first routed to the subscriber's directory number. A reason for routing the communication to the subscriber's directory number first (rather than directly to the different directory number in the message) is to have the communication appear as if it is being made from the line corresponding to the subscriber's directory number. It is desirable to have the communication appear as if it is being made from the subscriber's line for purposes of billing the subscriber, who has elected to provide callers with the option of having the calls forwarded to the different directory number.

More particularly, in the course of routing the communication first to the subscriber's directory number, the communication is routed to an SSP serving the subscriber's directory number ("subscriber's SSP"). In response to receiving the communication, the subscriber's SSP queries the SCP. In response to the query, the SCP causes the communication to be transferred to the different directory number. The SCP may cause the communication to be transferred to the different directory number by providing instructions to the subscriber's SSP. The instructions also may include a request to generate a billing record with respect to the communication. The subscriber's SSP then follows through on the instructions, transfers the communication to the different directory number, and if instructed, generates a billing record.

In sum, a communication, which has been terminated to the VMS, may be released from the VMS and acted upon without further involvement of the VMS through the provision of a message from the VMS indicating a release by the VMS and indicating at least an action to be taken with respect to the communication.

That the present inventions and the exemplary embodiments accomplish the features of the present inventions will become apparent from the detailed description of the exemplary embodiments and the drawings that follow.

DETAILED DESCRIPTION

The exemplary embodiments of the present inventions provide methods and systems for the release of a voice mail system (VMS) from involvement with a communication in an Advanced Intelligent Network (AIN) when the communication has been terminated to the VMS, but the communication is to undergo further processing in the AIN.

Exemplary Environment for Exemplary Embodiments

The exemplary embodiments of the present inventions are used, preferably, with a region-wide messaging (RWM) system, as described in greater detail below. Nevertheless, the present inventions may be used with any type of messaging system with the appropriate functionality.

The RWM system described herein may allow a subscriber to the messaging system within the region of the service provider to send, receive, forward, and reply to messages, including voice mail messages and Voice Profile for Internet Mail (VPIM) Messages. Subscribers may receive messages from other subscribers and non-subscribers. Subscriber-to-subscriber messaging, however, illustrates the advanced features of the RWM system, which may be available, such as: (1) each subscriber may send a message to another subscriber; (2) each subscriber may reply to a message received from another subscriber; (3) each subscriber may reply to a telephone message received from a non-subscriber by implementing a feature that dials the non-subscriber; and (4) each subscriber may receive and reply to Internet voice messages or fax messages.

Figure 1:
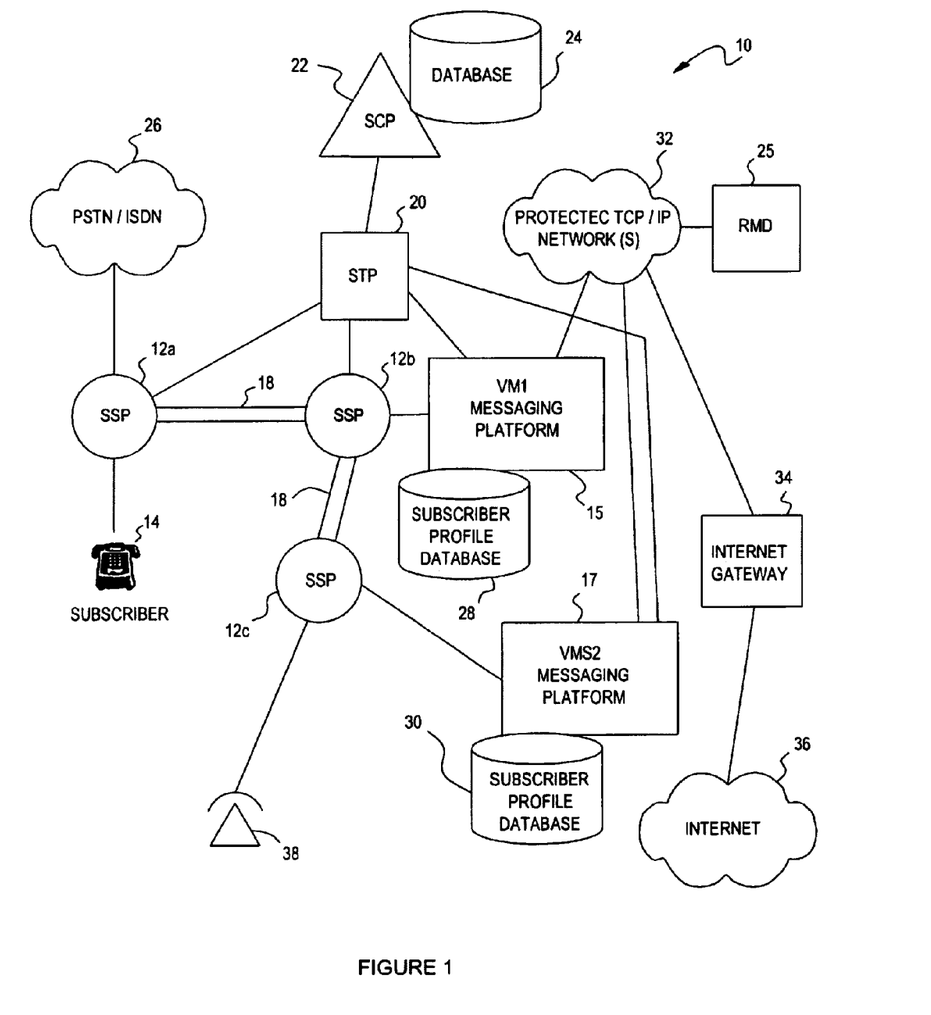
FIG. 1 is a block diagram of an exemplary messaging system such as a region-wide messaging system that may be used in connection with the present inventions.

Exemplary RWM System—FIG. 1

FIG. 1 is a block diagram of an exemplary RWM system 10 (also referred to as a telecommunications messaging network). The network 10 includes a variety of interconnected network elements. A group of such elements includes the plurality of end offices which are indicated as service switching points (SSPs or switches) 12a, 12b, 12c. An SSP typically includes switch functionality, but also includes other functionality so as to communicate with other network elements, and in particular, with Advanced Intelligent Network (AIN) elements. SSP 12a and SSP 12c are each coupled to a subscriber line, which also may be referred to as a line or a calling line. Each SSP 12a, 12b, 12c serves a designated group of lines, and thus, the SSP that serves a particular line may be referred to as its serving switch. The line is typically connected to a piece of terminating equipment including telephones 14, 38. Although telephones 14, 38 are illustrated as the terminating equipment, those skilled in the art will understand that such terminating equipment may include other telecommunications devices including, but not limited to, facsimile machines, computers, modems, etc. End offices may further be coupled through a tandem office (not illustrated), which may be used to connect and switch circuits between and among end offices.

Each active line in an AIN is assigned a ten digit (NPA-NXX-XXXX) line number regardless of whether seven or ten digits are dialed to reach the subscriber. A line number is commonly referred to as a telephone number or a directory number.

SSP 12b is connected by trunks to a voice mail system (VMS) (messaging platform) 15. (These trunks use Signaling System 7 signals for call set-up and other actions.) SSP 12c is connected by trunks to a voice mail system (VMS) (messaging platform) 17.

SSPs 12a, 12b, 12c are interconnected by a plurality of trunk circuits 18. These are the voice path trunks that connect the SSPs to connect communications. In addition to connections to other elements, each of the SSPs is connected to a local signal transfer point (STP) 20 via respective data links. Currently, these data links employ a signaling protocol referred to as Signaling System 7 (SS7). Much of the intelligence of the AIN resides in a service control point (SCP) 22 that is connected to STP 20 over an SS7 data link. Among the functions performed by the SCP 22 is the maintenance of network databases and subscriber databases as represented collectively by databases (subscriber data) 24.

In order to keep the processing of data and calls as simple as possible, a relatively small set of triggers is defined at the SSPs for each call. A trigger in the AIN is an event associated with a particular call that generates a packet to be sent to an SCP. The SCP queries its databases or service package applications (SPAs) for processing instructions with respect to the particular call. The results are sent back to the SSP in a response from the SCP 22 through STP 20. The return packet includes instructions to the SSP as to how to process the call. The instructions may be to take some special action as a result of a customized calling service or an enhanced feature. In response to the instructions, the SSP moves through the remaining call states, may encounter further triggers, and generates further packets that are used to set up and route the call. Similar devices for routing calls among various local exchange carriers are provided by regional STP (not illustrated) and by regional SCP (not illustrated) which may be connected to STP 20, SCP 22, and/or to the elements described herein through the public switched telephone network (PSTN) 26.

When a messaging subscriber (such as the person or entity using telephone 14) subscribes to a messaging service, an entry or a record is created in a VMS such as VMS 15. Each VMS 15, 17 includes subscriber administration, message retrieval, send, reply, forward, and mailbox maintenance functions, among others. Each VMS 15, 17 includes or is functionally connected respectively to a subscriber profile database 28, 30 (subscriber data). Each subscriber profile database stores subscriber-specific profile information (subscriber information) for retrieval by VMS functions. The VMSs 15, 17 are elements of the messaging system or service. To the protected TCP/IP network(s) 32 described below, each of the messaging platforms 15, 17 look like a valid TCP/IP element. In support of this, the VMSs 15, 17 may be assigned a TCP/IP (or IP) address and/or a domain name. Generally, the TCP/IP or other address or domain name of the VMS 15, 17 may be stored in a region-wide messaging directory (RMD) 25 discussed below, or may be stored on some domain name server (not illustrated) either in the protected TCP/IP network(s) 32, in some other element, or as a separate element. In further support of this TCP/IP capability, the VMSs 15, 17 may also provide operations access to mail administrative destinations, in addition to subscriber messaging mailbox destinations. In addition, each VMS 15 or 17 is an SS7 network element and as such is assigned an identifier such as a directory number, a destination point code (DPC) or the like.

The VMSs 15, 17 communicate with the SSP and the SCP according to the AIN 0.2 Switch—Intelligent Peripheral Interface Generic Requirements—1129-CORE Specification, AINGR: Switch—Intelligent Peripheral Interface (IPI) (A module of AINGR, FR-15); Document Number: GR-1129; Issue Number: 03; Updates: REV01—October 1998; Issue Date: September 1997; Product Type: Industry Requirements and Standards (RS); Component of FR-15, ("GR-1129") which is incorporated herein by reference. This GR-1129 describes the use of a Remote Operations (RO) parameter for indicating the invocation of a supplementary service. The RO parameter may be used to allow the SCP 22 and the VMSs 15, 17 to share information.

In this messaging service, TCP/IP messaging is allowed via a private Transmission Control Protocol/Internet Protocol (TCP/IP) network (protected TCP/IP network(s)) 32. The VMSs 15, 17 through the network 32 may use a Light-weight Directory Access Protocol (LDAP) to communicate with other elements such as a domain name server (not illustrated) and/or directories such as RMD 25 to obtain information with respect to the proper destination/recipient of a message.

An Internet gateway 34 provides secure access between the private TCP/IP network 32 and the Internet 36. The gateway 34 limits the access of VPIM traffic to and from the Internet 36. In addition, the gateway 34 performs authorized LDAP messaging directory lookups to route messages received from the Internet 36.

Advantageously, a subscriber's line number generally may be the subscriber's mailbox number associated with a messaging platform rendering service to the subscriber in the RWM system. In other words, a message addressed to the subscriber may include the subscriber's line number, which may also be the subscriber's mailbox number. Alternatively, the subscriber's mailbox number may relate to some other identifier associated with the subscriber. The subscriber's address may be based on the ten digit directory number (DN) using an International Telecommunications Union (ITV) Standard E.164 compliant address.

FIG. 1 also illustrates the exemplary use of a region-wide messaging directory 25 (RMD or directory) in the messaging system 10. The RMD 25 is functionally connected to the other elements of the messaging system 10 through inclusion in or a connection to the TCP/IP network 32. Although the RMD 25 is illustrated as connected to the system 10 through the TCP/IP network 32, the RMD 25, or course, may be connected to the system 10 in other ways or even be included in an element of the system such as in association with the directories 24 of SCP 22. An RMD provides high-speed directory look-up for messaging subscribers. Generally, an RMD stores information so as to determine which messaging platform of the RWM system serves which subscriber. Additional information on the manner in which the RMDs of the messaging system 10 store information on messaging platforms and subscribers and how RMDs interact with a network element 51 may be obtained from the commonly assigned and owned patent application entitled "Methods and System for Determining Message Routing Based on Elements of a Directory Number", which was filed with the United States Patent and Trademark Office on Dec. 13, 1999 and assigned Ser. No. 09/459,498, and which was filed with the United States Receiving Office pursuant to the Patent Cooperation Treaty (PCT) on Dec. 13, 1999 and assigned Application No. PCT/US99/29491 and which application is herein by reference.

Of course, an RMD may keep track of other information relating to subscribers of the RWM system. In particular, the RMD may act as both a client and a server with respect to the Light-weight Directory Access Protocol (LDAP). The RMD stores subscriber, service, and other messaging data. In addition, the RMD supports the LDAP attributes field for LDAP clients to choose the fields that they desire to retrieve from the server. Clients may retrieve the subscriber profile from the RMD.

Subscriber data may be stored in the RMD in the following exemplary fashion:

| Description/Directory Field | LDAP DN Attribute |
|---|---|
| Subscriber's Mailbox Number | CN (Common Name) |
| Name Announcement | Spoken Name |
| MDSBlocking | N/A |

Subscriber data is used to look up subscribers in the RMD. The data is also used for the purposes of routing and billing a subscriber's calls and messages to and from the messaging platforms.

Service data may be stored in the RMD in the following exemplary fashion:

| Description/Directory Field | LDAP DN Attribute |
|---|---|
| VMS ID | VMSID |
| VMS DAP Number | VMSDN |
| VMS Domain | Domain |
| VoiceEncoding | N/A |
| LATA | N/A |
| State | N/A |
| StateLATA | N/A |
| LDAP Credentials | Hidden in LDAP query |
| VMS IP address | Hidden in LDAP query |

The service data contains messaging platform-specific information to perform certain checks during directory lookup and call/message routing. The RMD may also store service provider data to ensure that a service provider has access to only its authorized subscribers' information.

Figure 2A:
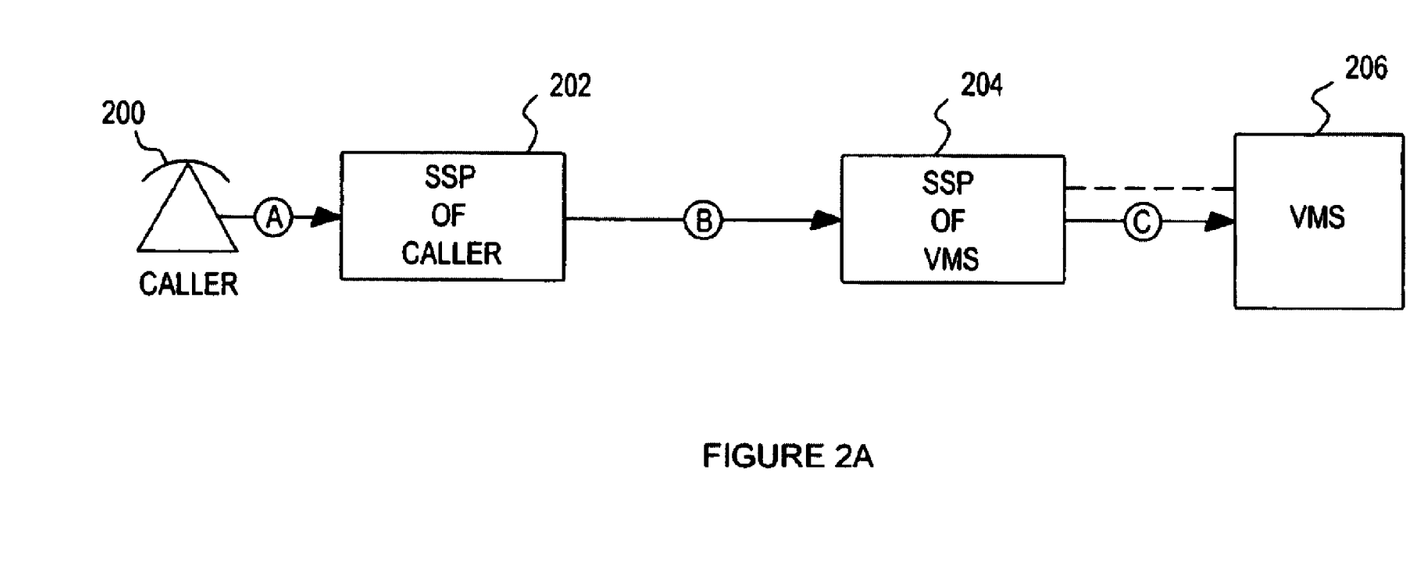
FIG. 2A is a block diagram illustrating the routing of an exemplary communication from a caller to a voice mail system (VMS) serving the called party.
Figure 2B:
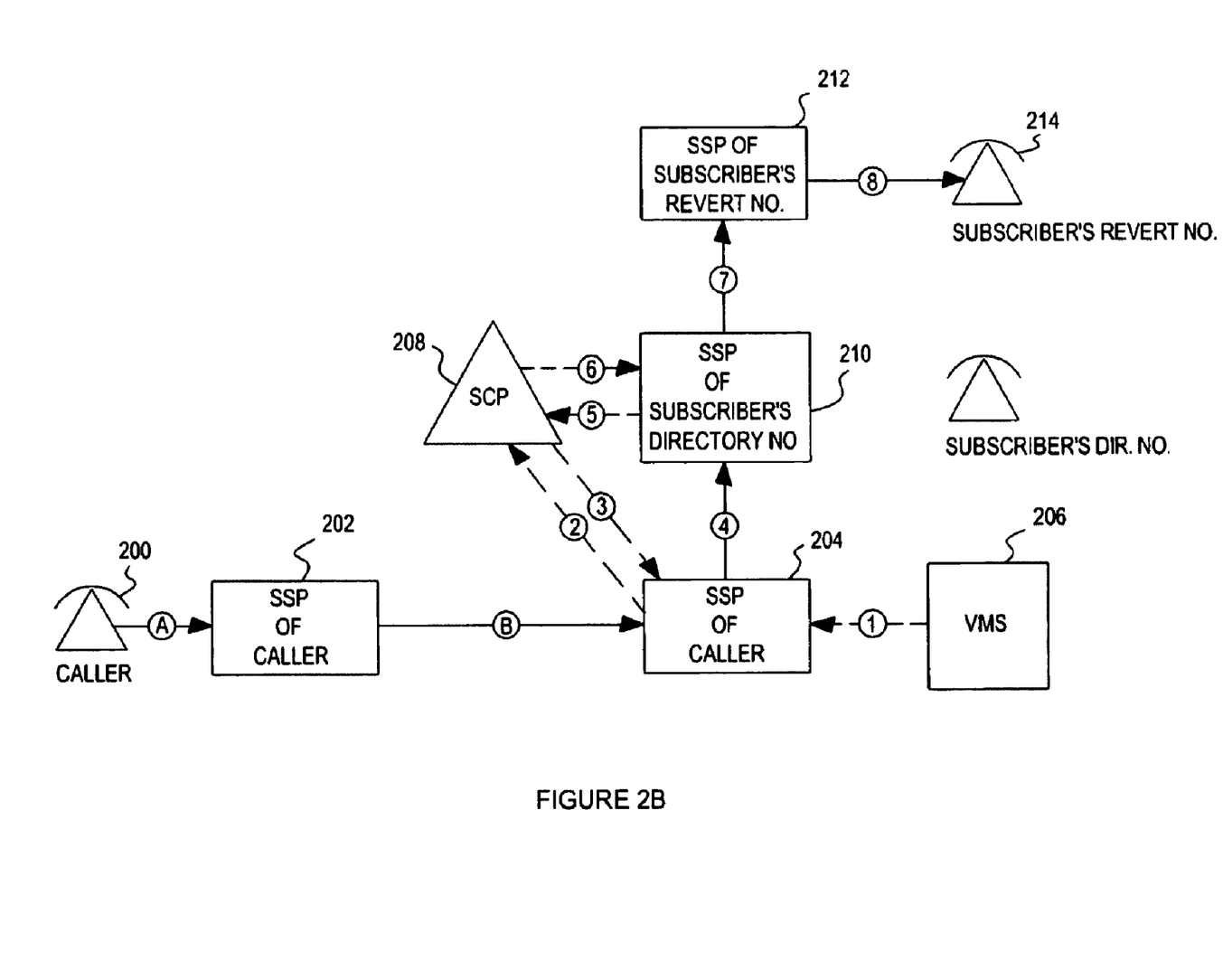
FIG. 2B is a block diagram illustrating an exemplary release of a VMS from a communication routed to the VMS in the course of further processing the communication.

Exemplary Release of a VMS—FIGS. 2A and 2B

FIGS. 2A and 2B provide details about an exemplary release of a VMS from involvement with a communication in an AIN when the communication has been terminated to the VMS, but the communication is to undergo further processing in the AIN. Minimal elements are illustrated in FIGS. 2A and 2B to provide clarity in explanation of the exemplary embodiments. Those skilled in the art will understand other elements may be involved as appropriate.

FIG. 2A illustrates the path of a communication from a caller 200 that has been terminated to a VMS 206. In particular, as illustrated by arrow A, the call path is from the caller 200 to the SSP 202 serving the caller. As indicated by arrow B, the communication is routed from the SSP 202 of the caller through the public switched telecommunications network (PSTN). In this interval, the communication is initially routed to the SSP serving the subscriber (not illustrated). The SSP serving the subscriber obtains further instructions from an SCP in response to a "no answer" or "busy" condition of the subscriber's terminating equipment, and then the communication is routed (typically to the SSP 204 of the VMS. As illustrated by arrow C, the SSP 204 of the VMS routes the communication to the VMS 206. The dashed line between the SSP 204 of the VMS and the VMS 206 indicates the exchange of control signals between these two elements.

Typically, a VMS requests the caller to leave a voice mail message, which would be stored by the VMS so as to be retrievable by the subscriber. Advantageously, the present inventions allow the caller to leave a voice mail message, but the present inventions also provide the caller or the communication with an alternative.

By this alternative, the VMS 206 may solicit the caller or the communication for an indication of an action to be taken with respect to the communication. In other words, the VMS 206 may provide the caller or the communication with an option for the exercise of an action to be taken with respect to the communication. An action may be something other than receipt of a voice mail message from the caller or the communication by the VMS 206 as retrievable by the subscriber. An action generally includes an event allowing for the release of the communication from the VMS 206. An action may include a transfer of the communication to a different directory number, i.e., a transfer of the call to another number, as illustrated in FIG. 2B.

The VMS 206 may solicit the caller or the communication by providing the following announcement: "If you would like to try to contact the subscriber at another directory number, please press '0'". Of course, for actions other than call transfer, the announcement may be different and may solicit a different input from the caller or the communication.

If the caller or the communication desires to exercise an option, such as an attempt to contact the subscriber at the different directory number, the caller or communication provides the indication of the action to be taken with respect to the communication. A receiver (not illustrated) of the VMS receives this indication.

FIG. 2B illustrates by the solid arrows between elements the path of the communication after the caller 200 has elected to be transferred to a different directory number. (As is explained below, the dashed arrows indicate the pathways for control signals such as between the SSP 204 of the VMS and the VMS 206 and such as the queries and responses that are exchanged between certain SSPs and an SCP in order to implement the call transfer.) As in FIG. 2A, the path of the communication remains from the caller 200, as indicated by arrow A, to the SSP 202 of the caller, and from the SSP 202 of the caller, as indicated by arrow B, through the PSTN to the SSP 204 of the VMS. But unlike in FIG. 2A, the call path of the communication does not continue from the SSP 204 of the VMS to the VMS 206 (arrow C in FIG. 2A). The reason for the call path not continuing to the VMS 206 is explained now in greater detail below.

As noted, if the caller or the communication desires to exercise an option of an action other than leaving a message, such as an attempt to contact the subscriber at the different directory number, the caller or communication provides the indication of the action to be taken with respect to the communication. For example, the caller may press "0". In response to receipt of the indication of the action by the VMS 206, a transmitter (not illustrated) of the VMS 206 transmits a message indicating the action to be taken with respect to the communication and indicating a release of the communication by the VMS 206. The message may be a GRU-1129 message including a remote operations (RO) parameter. The RO parameter may include information indicating what action is to be taken with respect to the communication such as a transfer of the communication (away from the VMS 206). This information may be stored in a field of the RO parameter such as a field denominated as an "operation type" field. For "call transfer", the operation type field of the RO parameter may be filled with the term "OperRevert" (or other term) to indicate the action of call transfer. Of course, if the action to be implemented with respect to the communication is something other than call transfer, other terms may be used in the "operation type" field so long as the correspondence is noted and used in the functionality of the system.

When a call transfer has been selected as the action to be taken with respect to the communication, then the RO parameter may include information, terms, or data in other fields. For example, the RO parameter may include the different directory number to which the communication is to be transferred. This different directory number may have been selected and input by the subscriber when the subscriber set up his or her preferences with respect to the service received from the VMS (or input by the subscriber at any other time in connection with his or her service from the VMS). The different directory number may be stored in a field of the RO parameter such as a "destination no." field. For "call transfer", the destination no. field of the RO parameter may be filled with terms that correspond to the different directory number as specified by the subscriber to indicate the terminating line or equipment where to transfer the call.

Also when the action indicated with respect to the communication is "call transfer", then the RO parameter may include the subscriber's directory number, which may be used later in the processing of the communication in various ways, such as by inclusion in a request for a billing record relating to the communication. The subscriber's directory number may be stored in a field of the RO parameter such as a "subscriber no." field.

When the action indicated with respect to the communication is something other than "call transfer", then the RO parameter may contain information different from that specified in the previous three paragraphs. In those cases, the RO parameter may include information relevant to the action to be implemented. In addition, the RO parameter may include different fields with information, terms or data other than those specified in the previous three paragraphs when the action indicated is other than "call transfer".

Advantageously, as a result of the message, the VMS is released from the communication, which is then acted upon based upon the information in the message supplied by the VMS without further involvement of the VMS with the communication.

As illustrated in FIG. 2B by arrow 1, the message is transmitted from the VMS 206 and received by the SSP 204 serving the VMS. When the SSP 204 receives the message, the SSP 204 pauses and queries a service control point (SCP) 208 for instructions. As illustrated by dashed arrow 2, in the query the SSP 204 provides the message (or at least the relevant contents of the message) to the SCP 208.

In response to the receipt of the message from the SSP 204, the SCP 208 directs that the action indicated in the message be taken with respect to the communication. For example, when the action indicated in the message is a transfer of the communication, then the SCP 208 directs that the communication be transferred. As illustrated by dashed arrow 3, the SCP 208 responds to the query from the SSP 204 and directs the SSP 204 to route the communication. The SSP 204 follows the direction. In this example, as illustrated by solid arrow 4, the SSP 204 routes the communication pursuant to the directions of the SCP 208 to the SSP 210 serving the subscriber's directory number ("subscriber's SSP" 210).

The reader may inquire why the communication is routed from the SSP 204 to the subscriber's SSP 210 instead of to the SSP 212 serving the different number (i.e., the SSP 212 of the subscriber's revert no.). In this exemplary embodiment, a reason for first routing the communication to the subscriber's SSP 210 (rather than directly to the SSP 212 serving the different directory number in the message) is to have the communication appear as if it is being made from the line corresponding to the subscriber's directory number. It is desirable to have the communication appear as if it is being made from the subscriber's line for purposes of billing the subscriber, who has elected to provide callers with the option of having the calls forwarded to the different directory number.

In response to receiving the communication, the subscriber's SSP 210 queries the SCP 208 as illustrated by dashed arrow 5. In response to the query, the SCP 208 causes the communication to be transferred to the different directory number. The SCP 208 may cause the communication to be transferred by providing instructions to the subscriber's SSP 210 as indicated by dashed arrow 6. The instructions also may include a request to generate a billing record with respect to the communication. The subscriber's SSP 210 then follows through on the instructions, and as illustrated by solid arrow 7, transfers the communication to the SSP 212 serving the different directory number. If instructed, the subscriber's SSP 210 generates a billing record. Finally, from SSP 212 serving the different directory number, as illustrated by solid arrow 8, the communication is terminated to the terminating equipment such as telephone 214 serving the different directory number (i.e., the subscriber's revert no.).

Effectively, by use of the message described above, the VMS 206 removes itself from the path of the communication. Rather than terminating at the VMS 206, or even including the VMS 206, the call path of the communication is illustrated in FIG. 2B as follows:

from the caller 200 (arrow A) to the SSP 202 serving the caller;

from the SSP 202 serving the caller through the PSTN (arrow B) to the SSP 204 serving the VMS;

from the SSP 204 serving the VMS to the subscriber's SSP 210;

from the subscriber's SSP 210 to the SSP 212 serving the different directory number; and from the SSP 212 serving the different directory number to the telephone 214 associated with the different directory number.

In sum, a communication, which has been terminated to the VMS 206, may be released from the VMS 206 and acted upon without further involvement of the VMS 206 with the communication through the provision of a message from the VMS 206 indicating a release by the VMS 206 and indicating at least an action to be taken with respect to the communication.

Figure 3:
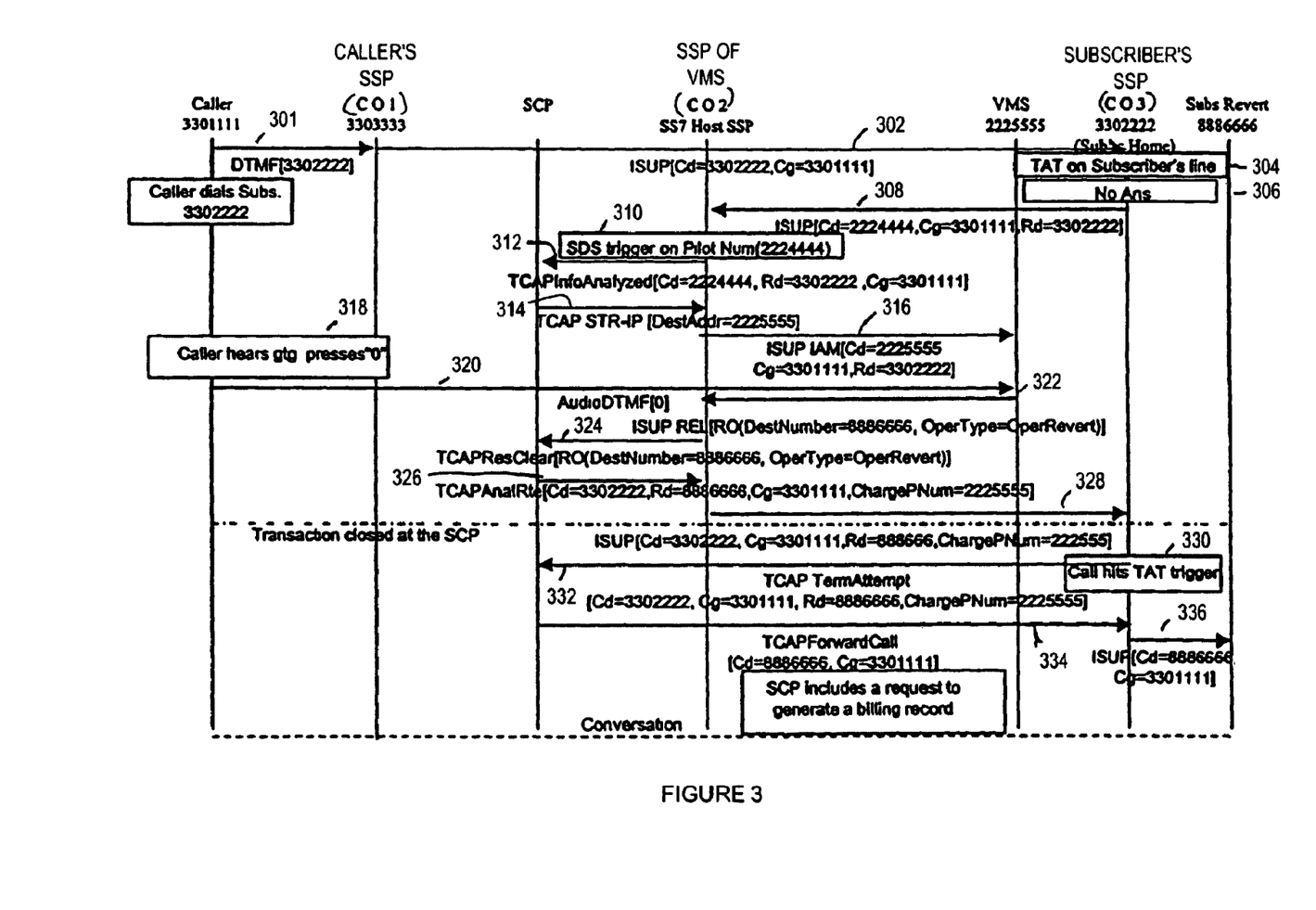
FIG. 3 is a timing diagram illustrating another exemplary release of a VMS from a communication routed to the VMS in the course of further processing the communication.
Figure 4:
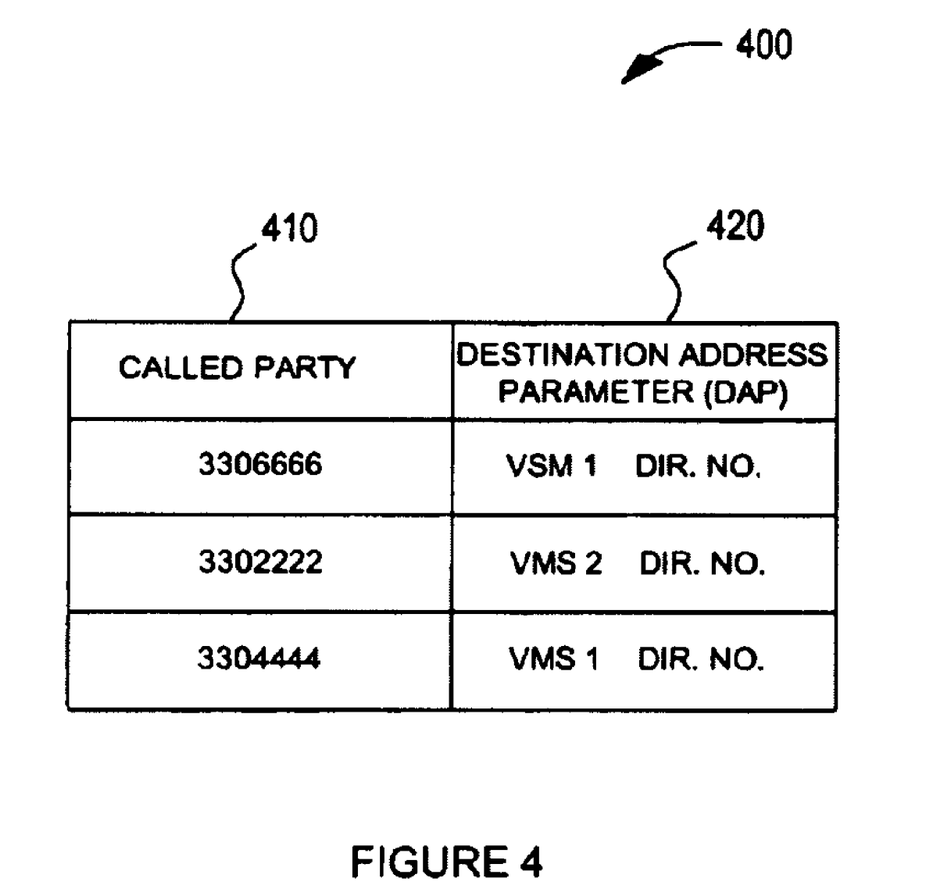
FIG. 4 is an exemplary table used in establishing correspondence between a directory number of a called party and a destination address parameter (DAP).

Exemplary "Operating Revert" Call—FIGS. 3 and 4

FIG. 3 is a diagram illustrating the call flow during an exemplary "call transfer" or "operator revert" call with respect to a call from a caller to a subscriber's directory number. As indicated by arrow 301, the caller (whole DN=3301111) dials the subscriber's home telephone number (which is DN=3302222). This call is routed by the caller's SSP (C.O.1 (3303333)) to the subscriber's SSP (C.O. 3 (3302222)) as indicated by arrow 302. The subscriber's SSP is provisioned with a Terminating Attempt (TAT) trigger as indicated by the notation "TAT on Subscriber's line" 304. The TAT trigger causes the subscriber's SSP to launch a query (not illustrated in FIG. 3) to an SCP. The SCP examines the calling, called, and redirecting number information, and determines that the call is not an "outdial" call (i.e., an outgoing call initiated by a VMS). Accordingly, the SCP instructs the subscriber's SSP to connect the call through to the subscriber's telephone number.

At the subscriber's telephone number, the call encounters a no answer condition as indicated by notation "No Ans" 306. The subscriber's SSP then forwards the call to the directory number of the VMS using a messaging access telephone number (the "pilot number"—DN=2224444). The call encounters a specific digits string ("SDS") trigger provisioned on the SSP serving the VMS as indicated by the notation "SDS trigger on Pilot Num (2224444)" 310. The SDS trigger causes the SSP serving the VMS to launch a TCAP Info_Analyzed query to the SCP as indicated by arrow 312. The TCAP Info_Analyzed query includes the called number [Cd=2224444] (i.e., the pilot number); the calling number [Cg=3301111] (i.e., the caller's directory number); and the redirecting number [Rd=3302222] (i.e., the subscriber's directory number).

The SCP, in response to the information received in the query from the SSP serving the VMS, accesses a table (or other data source) to determine instructions for further routing of the call. In particular, the SCP uses the called number in the query to determine the address of the voice mail system (voice mail platform) for routing of the call.

FIG. 4 illustrates an exemplary table such as may be used by the SCP for address information related to routing of the call. The table 400 includes a called party (or called party number or called number) column 410 and a destination address parameter ("DAP") column 420. The called party column 410 includes calling numbers of subscribers as entries. With respect to each entry in the called party column 410, the DAP column 420 stores a directory number (or other identifier) used in office translation to identify the SS7 trunks terminating to a VMS for a corresponding subscriber.

Referring again to FIG. 3, as indicated by arrow 314, based on the called number of 3302222 (which is the subscriber's home directory number), the SCP, using a TCAP STR-IP message including a DestAddr=2225555 (the directory number of the VMS), instructs the SSP serving the VMS to route the call to the VMS.

The SSP serving the VMS, as indicated by arrow 316, routes the call to the VMS 55 using an ISUP IAM message including the directory number of the VMS as the called number [Cd=2225555]; the directory number of the caller as the calling number [Cg=3301111]; and the subscriber's home telephone number as the redirecting number [Rd=3302222]. The VMS uses the redirecting number (which is the subscriber's home directory number in this example) to access the subscriber's mailbox. The VMS is programmed to play a greeting to the caller. The greeting indicates the name assigned to the accessed mailbox (e.g., "You have reached the subscriber's mailbox.") The greeting also provides the caller with information on the option of locating the subscriber (i.e., having the call transferred to a different directory number) by pressing a key (e.g., "0"). The caller, as indicated by arrows 318 and 320, hears the greeting, indicates that he or she desires to locate the subscriber by pressing "0", and the indication for the "0" (the DTMF tone corresponding to the "0") is transmitted to the VMS as indicated by the notation "AudioDTMF [0]".

In response to receipt of the indication, (the "0"), the VMS sends an ISUP Release (ISUP REL) message to the SSP serving the VMS as indicated by arrow 322. The ISUP Release message includes a remote operations (RO) parameter including: (1) an operation type (OperType) set to "operator revert" or a similar identifier (OperType=OperRevert); (2) a destination number (DestNumber) set to the operator revert ("call transfer") number established by the subscriber (DestNumber=8886666); and (3) a subscriber number that identifies the mailbox number of the subscriber or telephone number of the subscriber (not illustrated in the ISUP REL message in FIG. 3). Upon receiving the ISUP Release message, the SSP serving the VMS sends a TCAP Resource_Clear (TCAPResClear) message to the SCP as indicated by arrow 324. The TCAP Resource_Clear message includes a RO parameter including the information of the RO parameter in the ISUP Release message.

The SCP analyzes the TCAP Resource_Clear message and determines that the message includes an operator revert or call transfer message. Accordingly, the SCP, as indicated by arrow 326, sends a TCAP Analyze_Route (TCAPAnalRte) message to the SSP serving the VMS. The TCAP Analyze_Route message sets the called number to the subscriber's home directory number, the calling party number to the caller's directory number, the redirecting party number to the subscriber's operator revert (call transfer) number, and a charge party number [ChargePNum=2225555] to the directory number of the VMS. The SCP instructs the SSP to route the call to the called party number (which is the subscriber's home directory number in this example).

As noted with regard to FIGS. 2A and 2B, the exemplary embodiment described in these examples routes the communication first to the subscriber's directory number rather than directly to the call transfer number so that the subscriber's directory number may be used for billing purposes. Of course, if there is no reason to route the communication first to the subscriber's directory number, then the communication may be routed directly to the call transfer number.

The call is routed to the subscriber's SSP (C.O. 3), as indicated by arrow 328, using an ISUP message including: the called number (Cd=3302222); the calling number (Cg=3301111); the redirecting number (Rd=8886666); and the Charge number (ChargePNum=2225555). At the subscriber's SSP, the call again encounters a TAT trigger as indicated by notation "Call hits TAT trigger" 330. As before, the TAT trigger causes the subscriber's SSP to launch a query to the SCP, as indicated by arrow 332, and including a TCAP termination attempt (TCAP TermAttempt) message including: the called number (Cd=3302222); the calling number (Cg=3301111); the redirecting number (Rd=8886666); and the Charge number (ChargePNum=2225555).

The SCP examines the information received in the TCAP TermAttempt message, and determines that the call is an outdial call. The SCP then instructs the subscriber's SSP to route the call to the redirecting number using the TCAP Forward_Call message, as indicated by arrow 334. The TCAP Forward_Call message includes the subscriber's call transfer number as the called number (Cd=8886666); and the calling number as the number of the caller (Cg=3301111). The subscriber's SSP receives these instructions and routes the call using an ISUP message to the operator revert (call transfer) number as indicated by arrow 336. The ISUP message includes the called number as the subscriber's call transfer number (Cd=8886666); and the calling number as the number of the caller (Cg=3301111). The calling party number is the caller's number for purposes of long-distance billing.

CONCLUSION

From the foregoing description of the exemplary embodiments of the present inventions and operations thereof, other embodiments will suggest themselves to those skilled in the art. Therefore, the scope of the present invention is to be limited only by the claims below and equivalents thereof.

We claim:

1. A method for directing a communication request to terminating equipment associated with a predetermined revert number, the method comprising:

receiving at a voicemail server, a communication request from a caller for a callee at a first terminating equipment;

providing the caller with a prompt indicating a predetermined user option for contacting the callee at a second terminating equipment associated with the predetermined revert number; and in response to receiving caller input related to the predetermined user option, sending a release message indicating a release of the communication request from the voicemail server, wherein the release message facilitates rerouting the communication request to a second termination device associated with the predetermined revert number wherein the voicemail server is further configured to send the release message to a service switching point (SSP) associated with the voicemail server, wherein the release message includes a GR-1129 message comprising a remote operations (RO) parameter, and wherein the remote operations (RO) parameter includes the revert number.

2. The method of claim 1, wherein the communication request is routed from a first service switching point (SSP) associated with the first terminating equipment to a second service switching point (SSP) associated with the second terminating equipment.

3. The method of claim 1, wherein in response to sending the release message, the communication request is routed to a service switching point (SSP) associated with to the first terminating equipment.

4. The method of claim 1, wherein in response to sending the release message, the communication request is routed to a service switching point (SSP) associated with the second terminating equipment.

5. The method of claim 1, wherein the communication request is routed to the service switching point (SSP) associated with the second terminating equipment via a service switching point (SSP) associated with the first terminating equipment.

6. A voicemail server for receiving a communication request from a caller to a callee associated with a first terminating equipment, the voicemail server comprising:

a receiver operative to receive an indication of action to be taken with respect to the communication request; and a transmitter for transmitting a message indicating a release of the communication request, the message indicating the action to be taken with respect to the communication request, wherein the voicemail server is configured to provide the caller with a prompt indicating a predetermined user option for contacting the callee at a second terminating equipment associated with a predetermined revert number, wherein, in response to receiving caller input related to the predetermined user option, the communication request is released such that the communication request can be rerouted to the second terminating equipment without involvement of the voicemail server, wherein the voicemail server is further configured to send a release message to a service switching point (SSP) associated with the voicemail server, wherein the release message includes a GR-1129 message comprising a remote operations (RO) parameter, and wherein the remote operations (RO) parameter includes the revert number.

7. The voicemail server of claim 6, wherein in response to sending the release message, voicemail server is configured to route the communication request to a service switching point (SSP) associated with to the first terminating equipment.

8. The voicemail server of claim 6, wherein in response to sending the release message, the communication request is routed to a service switching point (SSP) associated with the second terminating equipment.

9. The voicemail server of claim 6, wherein the communication request is routed to the service switching point (SSP) associated with the second terminating equipment via a service switching point (SSP) associated with the first terminating equipment.

* * * * *